G. W. EMRICK.
DRILL CHUCK.
APPLICATION FILED APR. 11, 1911.
1,030,988.
Patented July 2, 1912.
2 SHEETS—SHEET 1.
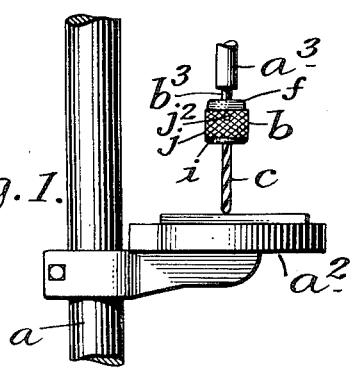
Fig. 1.
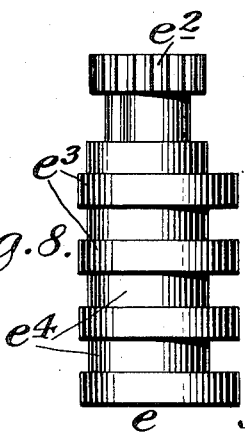
Fig. 8.
Fig. 9.
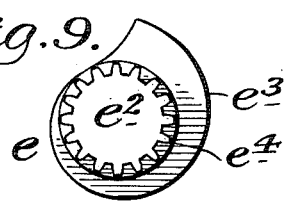
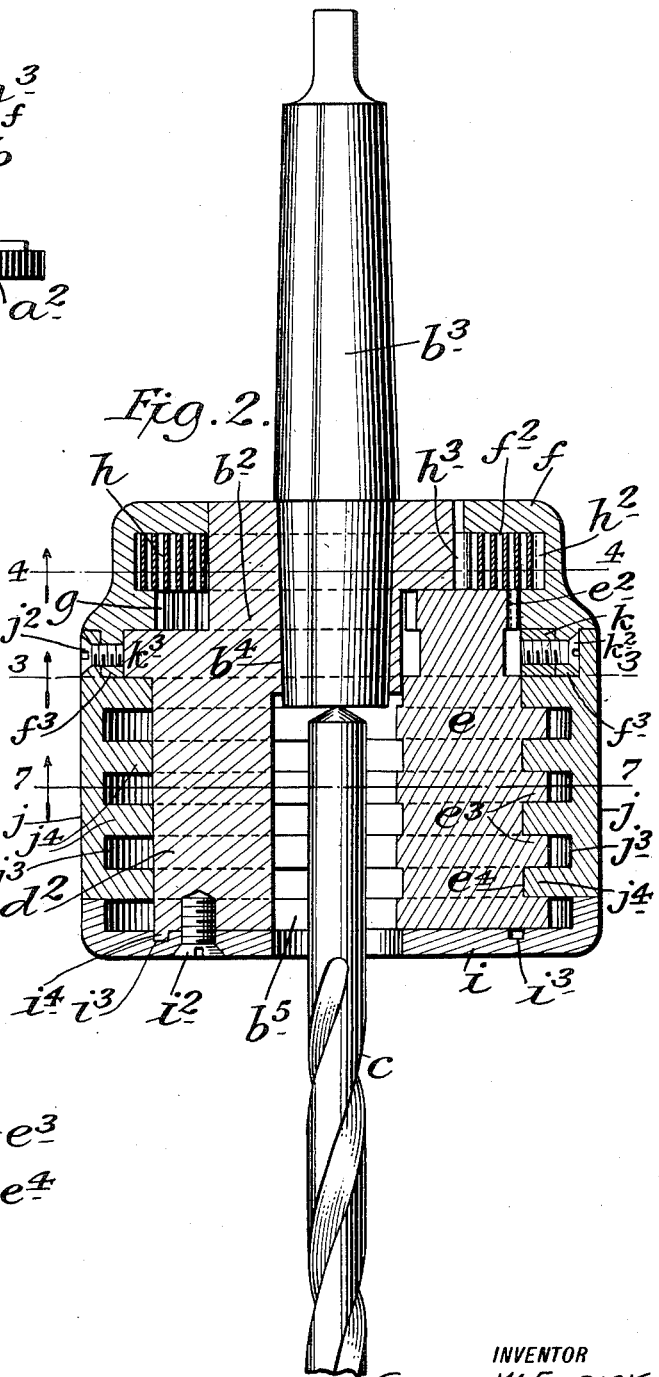
Fig. 2.
WITNESSES
A. R. Appleman
D. A. Mandeville
INVENTOR
GEORGE W. EMRICK.
BY
Edgar Tate & Co.
ATTORNEYS.

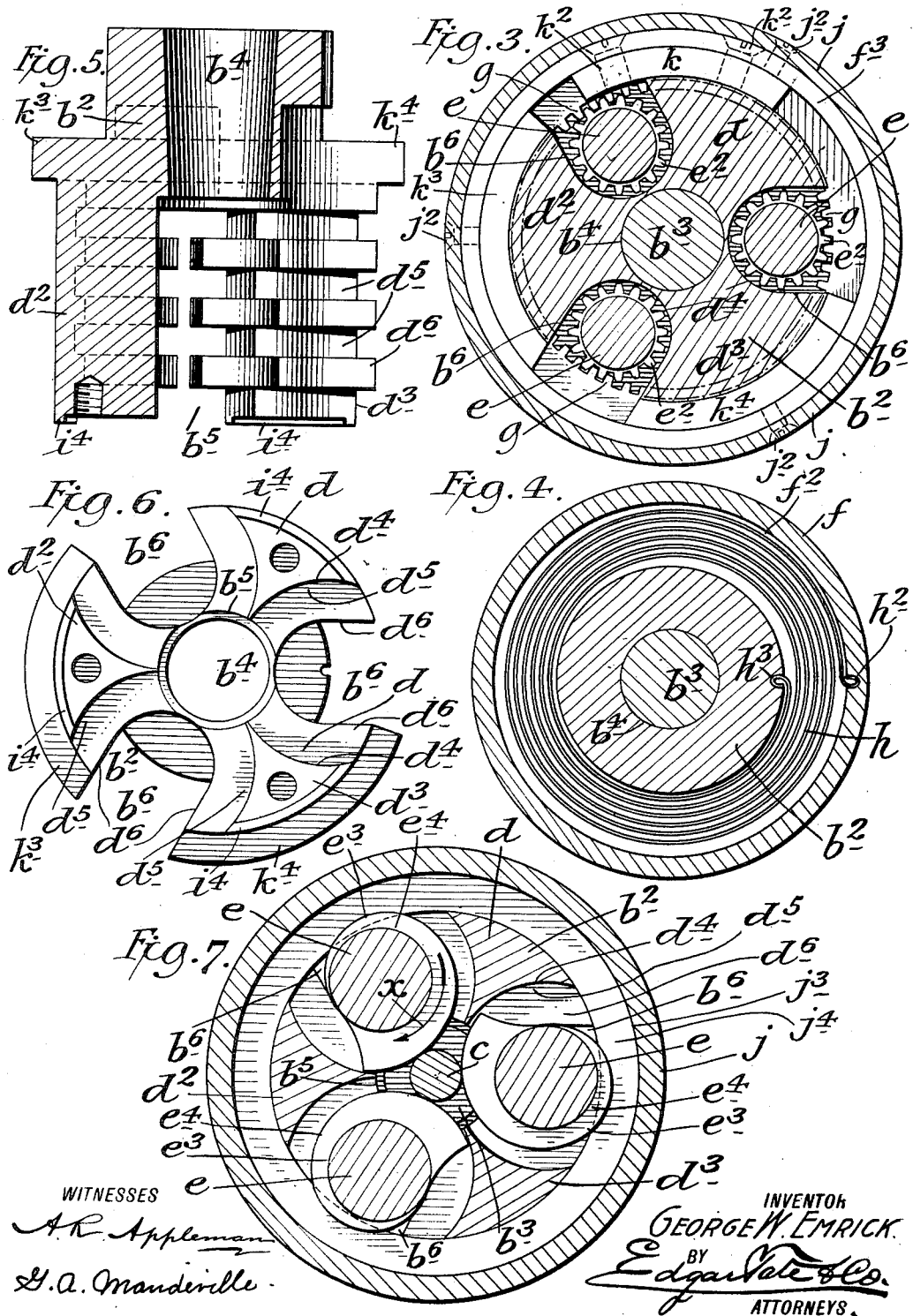

UNITED STATES PATENT OFFICE.

GEORGE W. EMRICK, OF BROOKLYN, NEW YORK, ASSIGNOR TO AUTOMATIC DRILL CHUCK CORPORATION, A CORPORATION OF NEW YORK.

DRILL-CHUCK.

1,030,988. Specification of Letters Patent. Patented July 2, 1912.

Application filed April 11, 1911. Serial No. 620,398.

*To all whom it may concern:*

Be it known that I, GEORGE W. EMRICK, a citizen of the United States, and residing at Brooklyn, in the county of Kings and State of New York, have invented certain new and useful Improvements in Drill-Chucks, of which the following is a specification, such as will enable those skilled in the art to which it appertains to make and use the same.

This invention relates to drill chucks and the object thereof is to provide an improved device of this class which is automatic in gripping a drill, but from which a drill may be released by simply gripping the head or body of the chuck while the machine is in operation and without stopping the rotary movement of the drill shaft; and with this and other objects in view, the invention consists in a drill chuck constructed and operated as hereinafter described and claimed.

The invention is fully disclosed in the following specification of which the accompanying drawing forms a part, in which the separate parts of my improvement are designated by suitable reference characters in each of the views, and in which:—

Figure 1 is a view showing the upright or standard of a drilling machine together with the work support connected therewith and a part of the drill shaft, and also showing my improved chuck, a drill connected therewith and a work piece on the support; Fig. 2 a view similar to Fig. 1, but showing only the chuck and the drill together with the spindle or shank of the chuck, said chuck being shown in central vertical section and the parts thereof being shown in inoperative position; Fig. 3 a cross section on the line 3—3 of Fig. 2, but showing the parts in operative position; Fig. 4 a cross section on the line 4—4 of Fig. 2; Fig. 5 a sectional side view of the central part or head of the chuck with which the shank or spindle which connects the chuck with the drill shaft is connected and in which, in practice, rotary tumblers are mounted; Fig. 6 a bottom plan view of the chuck head shown in Fig. 5; Fig. 7 a cross section on the line 7—7 of Fig. 2, but showing the parts in operative position; Fig. 8 a side view of one of the tumblers detached from the head of the chuck, and; Fig. 9 a plan view of said tumbler.

In the drawing forming part of this specification, reference being made to Fig. 1, I have shown at $a$ the upright or standard of a drill machine, said upright or standard being provided with a work support $a^2$ above which is a vertically arranged drill shaft $a^3$; and in said figure I have also shown at $b$ my improved drill chuck with which is connected a drill $c$.

In the construction of my improved drill chuck I provide a chuck head $b^2$ in connection with which the spindle or shank $b^3$ is formed, or to which said spindle or shank may be secured, said head being provided centrally of the top thereof with a socket $b^4$ for this purpose. The head $b^2$ is provided in the bottom thereof and in axial line with the socket $b^4$ with a central bore $b^5$ into which, in practice, the drill $c$ is inserted, and said head is also provided in the bottom portion thereof and in the outer walls thereof with three equally spaced and vertically arranged recesses $b^6$ which are U-shaped in cross section and which communicate with the central bore $b^5$ and which form tumbler chambers as hereinafter described, and which are separated by vertically arranged jaw members $d$, $d^2$ and $d^3$, the outer surfaces of which are arc-shaped in cross section and the side walls of which are concave in cross section as shown at $d^4$, and the side walls of the jaw members $d$, $d^2$ and $d^3$ are provided with equally spaced recesses $d^5$ forming corresponding ribs $d^6$, the faces of which are also curved to correspond with the side walls of the jaws $d$ or the faces of the recesses $d^5$.

Mounted in the recesses or tumbler chambers $b^6$ are vertically arranged cylindrical tumblers $e$ provided at their upper ends with gears $e^2$, and the body portions of which are provided with annular cam ribs $e^3$ separated by corresponding annular recesses $e^4$, and the ribs $d^6$ of the jaws $d$ fit in the recesses $e^4$ of the tumblers $e$, while the ribs $e^3$ of said tumblers fit in the recesses $d^6$ of the jaws $d$.

Mounted on the top of the head $b^2$ of the chuck is an annular rotary cap $f$ having an annular spring chamber $f^2$ below which the cap $f$ is provided with an internal annular gear $g$ with which the gears $e^2$ of the tumblers $e$ mesh, as clearly shown in Figs. 2 and 3. Placed in the annular chamber $f^2$ is a helical spring $h$, and one end of this spring is secured to said annular head at $h^2$ and the other end to the head of the chuck at $h^3$, and these connections are preferably made detachable. The cap $f$ is also provided on the bottom thereof with an annular depending flange $f^3$, and the bottom of said head is provided with a detachable plate $i$ which is secured to the jaw members $d$, $d^2$ and $d^3$ by screws $i^2$, and mounted between the annular cap $f$ and the bottom plate $i$ and inclosing the said jaw members is a rotary shell $j$ which is secured to the cap $f$ by screws $j^2$ passed therethrough and into the flange $f^3$, and said annular head and said shell $j$ are therefore rotatable on the clutch head $b^2$ within certain limits, this movement being an oscillatory movement. The rotary shell $j$ is provided in the inner walls thereof with annular recesses $j^3$ forming corresponding annular ribs $j^4$, and these ribs fit in the recesses $e^4$ of the tumblers $e$ and the cam ribs $e^3$ of said tumblers fit in the recesses $j^3$.

The bottom plate $i$ is provided in its top surface with an annular groove $i^3$, and the jaw members $d$, $d^2$ and $d^3$ are provided with curved ribs $i^4$ which fit in said groove, this construction being designed to facilitate the proper connection of the plate $i$ with said jaw members or with the head $b^2$ of the chuck. The rotary head $f$ is provided at one side thereof and inwardly of the flange $f^3$ with a segmental stop $k$ which is secured in position by screws $k^2$, or said stop may be formed integrally with said flange, and the jaws $d^2$ and $d^3$ of the chuck head are provided at the top thereof with segmental ribs or extensions $k^3$ and $k^4$ which form stops and which operate in connection with the stop $k$, and the only difference between the jaws $d$, $d^2$ and $d^3$ of the chuck head is in the ribs or stops $k^3$ and $k^4$ which are formed on or connected with the tops of the jaws $d^2$ and $d^3$.

It will be observed that the U-shaped recesses $b^6$ which form the tumbler chambers in the sides of the head $b^2$ of the chuck are provided with upwardly directed extensions in which the gears $e^2$ of said tumblers rotate and around which the internal gear $g$ is formed and these upwardly directed extensions of the recesses $b^6$ are also inclosed by the flange $f^3$ of the cap $f$.

The operation will be readily understood from the foregoing description when taken in connection with the accompanying drawing and the following statement thereof. In assembling the parts of my improved chuck, the cap $f$ is first placed in position on the chuck head, after which the cylindrical tumblers $e$ are placed in their respective recesses in the head $b^2$ of the chuck and turned so that the cam ribs $e^3$ thereon which do not extend entirely around said tumblers will be directed inwardly, after which the rotary shell $j$ is slipped on over the chuck head and over said tumblers and secured to the cap $f$, after which the bottom plate $i$ is secured in position. This construction, as will be seen gives to the jaws and to the rotary tumblers a number of bearings on the rotary shell, and also gives the required strength to the chuck head, and it will be understood that the rotary shell $j$ can only be mounted in the manner herein described. It must be understood that the spring $h$ operates to normally hold the tumblers $e$ in the operative or locked position shown in Fig. 7, in which position the drill $c$ is securely held and may be operated by the shaft $a^3$ as will be readily understood. It will also be understood that the entire chuck revolves with the shaft $a^3$, and supposing said shaft to be turned to the right, if it is desired to release the drill $c$, all that is necessary is to grasp the shell $j$ or the top thereof formed by the cap $f$ in one hand. This operation stops the rotation of said shell and cap and holds them stationary. It will also be understood that this grasping of the shell $j$ and the stoppage of its rotation is only momentary, but during the same, the rotation of the head $b^2$ of the chuck continues, and through the operation of the gear $g$ on the head gears $e^2$ of the tumblers $e$, the said tumblers are rotated to the left as indicated by the arrow X in Fig. 7, said figure being a bottom plan view, and the drill $c$ is released and may be removed, as will be readily understood. It must also be understood that the stoppage of the rotation of the shell $j$ puts the spring $k$ under increased tension and the moment the shell $j$ is released the said shell $j$ and cap $f$ are turned to the right or in the direction of the rotation of the chuck and the tumblers $e$ are again thrown into operative position. It will also be understood that the operation of reinserting a drill is exactly the same as that above described for detaching one.

The shell $j$ is preferably milled or roughened on its outer surface so as to facilitate the stoppage of its rotation by grasping it with the hand as hereinbefore described.

With my improved chuck, drills of different sizes or of different dimensions in cross section may be employed, as will be readily seen, and with the dimensions of the various parts made as shown in the accompanying drawing, drills, the shanks of which vary from three-eighths to seven-eighths of an inch or over may be employed.

Having fully described my invention, what I claim as new and desire to secure by Letters Patent, is:—

1. A drill chuck comprising a head portion in the central bottom part of which is an axial bore around which are mounted a plurality of vertically arranged detachable and rotary tumblers having spiral cam ribs on one side and which do not extend entirely around said tumblers, a rotary cap mounted on said head and geared in connection with said tumblers, a helical spring placed between the rotary cap and said head and connected with each, a rotary shell adapted to be passed on over the bottom of said head and said tumblers and provided with internal ribs which correspond with the spaces between said cam ribs and which is secured to said cap, and a bottom plate secured to the bottom of said head and holding said shell and tumblers in position.

2. A drill chuck comprising a head portion in the central bottom portion of which is an axial bore around which are equally spaced jaws forming vertically arranged recesses, detachable rotary tumblers mounted in said recesses and having spiral cam ribs on one side and which do not extend entirely around said tumblers, a rotary cap mounted on said head and geared in connection with said tumblers, a helical spring placed between the cap and said head and connected with each, a rotary shell passed on over the bottom of said head and said tumblers and provided with internal ribs which correspond with the spaces between the cam ribs on said tumblers and which bear on said jaws and which is secured to said cap, and a bottom plate secured to the bottom of said head for holding said shell and tumblers in position.

3. A drill chuck comprising a head portion in the central bottom part of which is an axial bore around which are mounted a plurality of vertically arranged detachable and rotary tumblers having spiral cam ribs on one side and which do not extend entirely around said tumblers, a rotary cap mounted on said head and geared in connection with said tumblers, a helical spring placed between the rotary cap and said head and connected with each, a rotary shell adapted to be passed on over the bottom of said head and said tumblers and provided with internal ribs which correspond with the spaces between the said cam ribs, and a bottom plate secured to the bottom of said head and holding said shell and tumblers in position.

In testimony that I claim the foregoing as my invention I have signed my name in presence of the subscribing witnesses this 11th day of April 1911.

GEORGE W. EMRICK.

Witnesses:
C. E. MULREANY,
G. A. MANDEVILLE.